July 29, 1924.

W. I. WHEELER

POWER TRANSMISSION MECHANISM

Filed Sept. 15, 1920

INVENTOR.
W. I. Wheeler
BY
Watson E. Coleman
ATTORNEY.

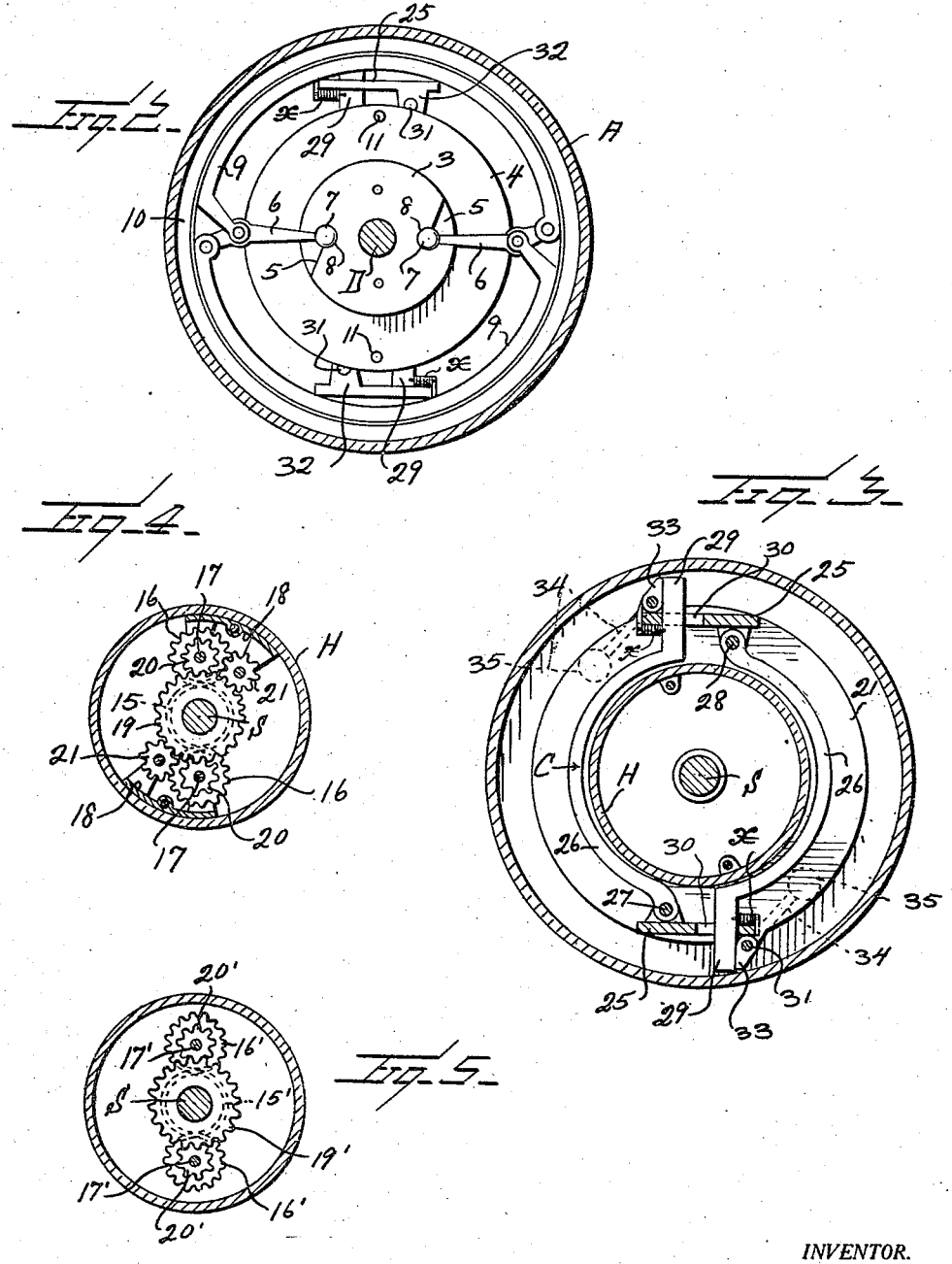

Patented July 29, 1924.

1,503,404

UNITED STATES PATENT OFFICE.

WILLIAM I. WHEELER, OF SCOTTVILLE, ILLINOIS.

POWER-TRANSMISSION MECHANISM.

Application filed September 15, 1920. Serial No. 410,449.

*To all whom it may concern:*

Be it known that I, WILLIAM I. WHEELER, a citizen of the United States, residing at Scottville, in the county of Macoupin and State of Illinois, have invented certain new and useful Improvements in Power-Transmission Mechanisms, of which the following is a specification, reference being had to the accompanying drawings.

This invention relates to certain improvements in power transmission mechanisms, and it is an object of the invention to provide a novel and improved device of this general character wherein the speed of the driven shaft with respect to the driving shaft is automatically controlled and particularly in accordance with the engine load, together with means whereby a positive second or intermediate speed may be obtained.

Another object of the invention is to provide a novel and improved device of this general character embodying an operative connection between the driving and driven shafts and wherein the driven shaft comprises two relatively rotating sections operatively connected one with the other, whereby the working section of the driven shaft may be caused to positively operate at a high speed, low speed, or at an intermediate or second speed.

The invention consists in the details of construction and in the combination and arrangement of the several parts of my improved power transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 2 is a sectional view taken substantially on the line 2—2 of Figure 1.

Figure 3 is a sectional view taken substantially on the line 3—3 of Figure 1.

Figure 4 is a sectional view taken substantially on the line 4—4 of Figure 1, and Figure 5 is a sectional view taken substantially on the line 5—5 of Figure 1.

Figure 1:
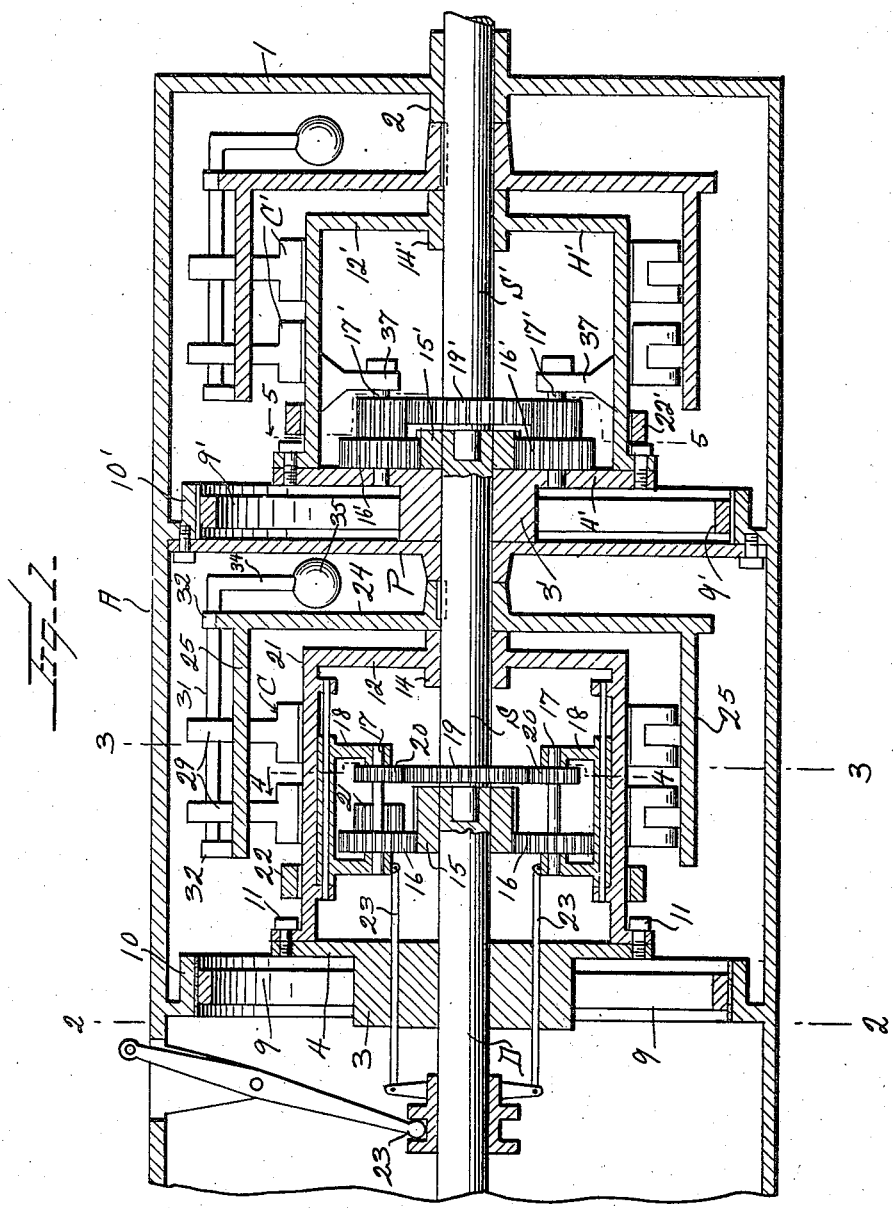
Figure 1 is a view partly in longitudinal section and partly in side elevation of a transmission mechanism constructed in accordance with an embodiment of my invention.

As disclosed in the accompanying drawings, D denotes a driving shaft of a motor supported in a conventional manner and which extends within the housing or casing A. The housing or casing A has the end thereof remote from the driving shaft D permanently closed by the head or wall 1. The inserted end portion of the shaft D is operatively engaged with an end portion of a shaft section S extending through and rotatably supported by a plate P intersecting the housing or casing A. The opposite end portion of the shaft section S is operatively engaged with the driven shaft S'. The driven shaft S' extends exteriorly of the housing or casing A through the bearing 2 provided in the closed end or head 1 of said housing or casing.

Loosely mounted upon the shaft D within the housing or casing A is a hub 3 of requisite diameter and which has its peripheral portion at one end defined by an outstanding plate 4. At diametrically opposed points, the periphery of the hub 3 is provided with the sockets 5 from which extend the links 6. The inner ends of the links 6 are provided with the balls 7 seated in the supplemental sockets 8 so that the links 6 will be carried substantially in a radial position when the hub 3 rotates in one direction but will be automatically shifted to a position inclined to the radial when the hub is shifted in the opposite direction.

Each of the links 6 is pivotally connected to the adjacent end portions of the friction band or brake sections 9 and, as is particularly illustrated in Figure 2, it is to be noted that one end of each band or brake section is pivoted inwardly of the adjacent end of the second band or brake section and that there is sufficient space between the band or brake sections to permit the same to rock. The links 6 operate as toggle links so that when the hub is rotated in one direction, the band or brake sections 9 will be expanded and when rotated in the opposite direction, said band or brake sections will be contracted. When the sections 9 are expanded they frictionally engage the annular flange 10 arranged within the casing or housing A and carried by the peripheral wall thereof, said flange 10 being concentric to the hub 3.

The general construction and arrangement of the clutch mechanism just described is substantially the same as a similar structure embodied and claimed in my pending application Serial No. 293,200, filed April 28, 1919.

Bolted or otherwise secured, as at 11, to the peripheral portion of the plate 4 and partially surrounding the shaft S is a housing or casing H. The housing or casing H is preferably cylindrical in form so that the same may constitute a drum for a purpose to be hereinafter more particularly referred to. The end portion of the housing or casing H remote from the hub 3 is closed by the end plate or head 12 preferably integral therewith and which is provided at its axial center with a hub or bearing 14 through which the shaft section S is freely disposed. The housing or casing H, together with the plate 4 and hub 3, afford a member mounted upon both of the shafts D and S and in a manner whereby the shafts D and S and the member are capable of independent rotation or for rotation in unison in a manner which will now be described.

The inserted end extremity of the shaft D has fixed thereto a relatively broad gear 15. Meshing with the gear 15 are the diametrically opposed gears 16. Each of the gears 16 is fixed to a shaft 17 rotatably supported by a carriage 18. The carriage 18 is supported by the wall of the housing or casing H for sliding movement in a direction longitudinally of the shafts D and S.

The inserted end extremity of the shaft S has affixed thereto a gear 19 preferably of a greater radius than the gear 15. The gear 19 is in mesh with the gears 20, when the carriages are in one position, said gears 20 being each fixed to a shaft 17. By this means, the driving shaft D is operatively engaged with the driven shaft S and in a manner whereby the driven shaft S may be rotated at a speed less than the speed of the driving shaft D. The various gears just referred to may be of any desired ratios so that the ratio of speed between the driving shaft D and the shaft S may be as preferred.

Each of the carriages 18 is also provided with a relatively broad gear 21 constantly in mesh with a gear 16. When the carriages 18 are sufficiently moved in a direction inwardly of the shaft S, the gears 20 disengage from the gear 19 and the gears 21 are brought into mesh with the gear 19, resulting in a reverse rotation of the shaft S. When this reversing of the direction of rotation of the shaft S is required, a suitable braking means generally indicated at 22 is employed to positively hold the housing or casing H against rotation. The mechanism as generally indicated at 22 may be of any type preferred and is adapted to be manually operated from a point exteriorly of the housing or casing A and may be of the construction indicated in my additional pending application Serial No. 401,892, filed August 7, 1920.

23 denotes an actuating mechanism for the carriages 18 and which mechanism may be operated in any desired manner. I wish it to be understood that it is not my purpose to limit the present embodiment of my invention to this particular arrangement of gears or reversing mechanism just described as any conventional mechanism may be substituted therefor. I wish to state, however, that this particular arrangement and combination of gears and reversing mechanism is claimed in my pending application Serial No. 402,080, filed August 9, 1920, and which is a division of my pending application Serial No. 360,955, filed February 24, 1920.

Keyed or otherwise secured to the shaft S at a point inwardly of the housing or casing H and in close proximity thereto is a disc or plate 24. The disc or plate 24 at diametrically opposed points is provided with the inwardly directed arms 25 of a length to extend inwardly of the housing or casing H along the major length thereof. The arms 25 are relatively broad and operatively engaged with said arms 25 at a plurality of points spaced longitudinally thereof are the clutching units C. Each of said units C is adapted for co-action with the housing or casing H, each of said clutching units in itself being of a tension insufficient to positively lock or hold the housing or casing H against rotary movement relative thereto but the combined action of said clutching units being sufficient to effect such action.

Each of the clutching units C comprises the band or brake sections 26, an end portion of one of said sections 26 being pivotally engaged, as at 27, with an arm 25 at one side of its transverse center, while an end portion of the second band or brake section is pivotally engaged, as at 28, with a second arm 25 at the opposite side of its transverse center. The opposite or free end portion of each of the brake or band sections 26 is provided with an ear or extension 29 extending through a transversely disposed slot 30 formed in the adjacent arm 25.

Each of the arms 25 outwardly of the extensions or ears 29 is provided with a rock shaft 31 extending longitudinally of the arms 25 and rotatably supported by the bearings 32. Fixed to the shaft 31 are the cam members 33 of a number equal to the number of the extensions or ears 29 and each of said cam members 33 has separate coaction with a single one of said ears or extensions 29.

An end portion of each of the shafts 31 is provided with the laterally disposed arm 34 provided at its free end portion with a weighted member 35 so that under the centrifugal force created by the rotation of the disc or plate 24 with the shaft S, the arms 34 will move outwardly resulting in such rotation of the shafts 31 to cause the cams 33 to engage the ears or extensions 29 of the brake or band sections comprised in each of the clamping units to cause said band or brake sections to have the requisite frictional contact with the periphery of the housing or casing H whereby said casing or housing H may be caused to rotate in unison with the shafts D and S so that the speed of the shaft S will be increased. It will be understood that when the clamping action of the clutching units C is sufficient to hold the casing or housing H against rotation relative to said clutching units, the shaft S will positively rotate in second or intermediate, but the rotation of the shaft S between second or intermediate and low will depend upon the amount of slip the housing or casing H may have with respect to the clutching units C. In accordance with the amount of slip of the housing or casing H with respect to the clutching units C, the speed of the shaft S will be reduced above low. As before stated, the low speed of the shaft S occurs when the clutching units C are out of frictional or working engagement with the housing or casing H.

The band or brake sections 26 comprised in the clutching units C are normally maintained out of frictional contact with the casing or housing H and, as herein disclosed, this is accomplished by the retractile members or springs $x$.

The plate P has its peripheral portion suitably connected to the side portion of an annular flange 10' arranged within the casing or housing A and carried by a wall thereof, said flange being concentric to the end portion of the shaft S remote from the gear 19. Coacting with the flange 10' are the band or brake sections 9' carried by the hub 3' in the same manner as hereinbefore set forth with respect to the brake or band sections 9.

The hub 3' has one end portion defined by an outstanding plate 4' to which is bolted or otherwise secured, as at 11', the housing or casing H'. The hub 3' is loosely mounted on the end portion of the shaft S remote from the gear 19 and the housing or casing H' partially surrounds the outer or driven shaft S'. The housing or casing H' is also preferably cylindrical in form so that the same may constitute a drum.

The end portion of the housing or casing H' remote from the hub 3' is closed by the end plate or head 12' provided at its axial center with a hub 14' through which the shaft S' is freely disposed. The housing or casing H', together with the plate 4' and hub 3', afford a member mounted upon both of the shafts S and S' and in a manner whereby the shafts S and S' and the member are capable of independent rotation or for rotation in unison.

The end portion of the shaft S adjacent the shaft S' has fixed thereto a gear 15'. Meshing with the gear 15' are the diametrically opposed gears 16' fixed to the shafts 17' rotatably supported by the plate 4' and an inwardly directed bearing 37 carried by the peripheral wall of the housing or casing H'.

The inserted end portion of the shaft S' has affixed thereto a gear 19' of a radius greater than the gear 15'. The gear 19' is in mesh with the gears 20', said gears 20' being each fixed to a shaft 17'. By this means, the shaft S is operatively engaged with the shaft S' and in a manner whereby the shaft S' may be rotated at a speed less than the speed of the shaft S. The various gears just referred to may be of any desired ratios so that the ratio of speed between the shafts S and S' may be as preferred.

Coacting with the housing or casing H' are the clutching elements C' constructed in accordance with the clutching elements C hereinbefore referred to and which clutching elements are automatically operated by centrifugal force in the same manner as has been hereinbefore described in connection with the clutching elements C.

A suitable braking element 22' coacts with the housing or casing H' and is preferably manually operated from a point exterior of the housing or casing A in the same manner as disclosed in my pending application Serial No. 401,892, filed August 7, 1920.

In practice, the driving shaft D, when the clutching elements C are out of engagement with the drum or casing H, makes two revolutions to one revolution of the shaft S and this speed of the shaft S is also transmitted to the shaft S'. The operative connection between the shafts S and S' is also in ratio of two to one, thereby insuring a four to one ratio between the shafts D and S'. When the clutching elements C engage the drum or casing H to effect a unitary rotation of the shafts D and S, the shaft S' will run in a positive second or intermediate speed. When the clutching elements C' engage the housing H' to effect the unitary rotation of the shafts S and S', the shaft S will be rotating in high speed as the shafts D, S and S' will all rotate in unison.

In view of the foregoing, it will be seen that with my improved mechanism as herein embodied, the speed of the shaft S' is automatically changed from low speed to intermediate and then into high or direct drive. When the shaft S' is rotating in high, the clutching elements C' will disengage the coacting drum H' before the clutching elements C because the clutching elements C' possess less leverage than the elements C. When the clutching elements C' become inoperative or disengaged from the member H', the shaft S' will operate on a positive second or intermediate speed. Upon a further retarding of the shaft S', dependent upon the load, the clutching elements C become inoperative or disengaged from the coacting housing or casing H, whereupon the shaft S' is caused to rotate at the lowest speed which is determined by the gear ratio employed. To effect a reverse rotation of the shaft S, the shifting of the operating mechanism in a rearward direction causes the gear 20 to disengage the gear 19 and the gear 21 to engage the gear 19, thus causing a reverse ratio of shafts D and S. The brake band 22 grips the member or housing H to hold it against rotation in a direction opposite to the direction of rotation of the shafts S and S'. The brake band 22' coacts with the housing or casing A for the same purpose.

While not necessary, it is preferred that the brake elements or bands 22 and 22' be operated in unison from a single pedal or lever but as this in itself is not believed to form a particular part of the present invention, a detail description and illustration of this structure is thought unnecessary.

While it has hereinbefore been stated that each of the clutching units in itself is of a tension insufficient to positively lock or hold the coacting housing or casing against rotation or relative movement, it is to be understood if for any reason it becomes necessary that any one of the units have sufficient tension to effect such locking or holding action, it will only be necessary to adjust the leverage of the weight or the adjusting nut on the band or the screen or all of them.

It will also be understood that by increasing the number of shaft sections, four or more positive speeds may be obtained.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In a transmission mechanism, a drive shaft, a driven shaft, said driven shaft being divided into a plurality of sections, an automatically actuated variable speed mechanism operatively connecting adjacent sections of the driven shaft, and an automatically actuated variable speed mechanism operatively connecting the drive shaft and one of the sections of the driven shaft, each of said variable speed mechanisms including braking elements, the braking element of one of such speed mechanisms having greater leverage than the braking elements of the second speed mechanism.

In testimony whereof I hereunto affix my signature.

WILLIAM I. WHEELER